Oct. 9, 1934.    E. M. BOURNONVILLE    1,975,777

ROTARY VALVE ENGINE

Filed July 28, 1933    2 Sheets-Sheet 1

INVENTOR
Eugene M. Bournonville
By
ATTORNEY

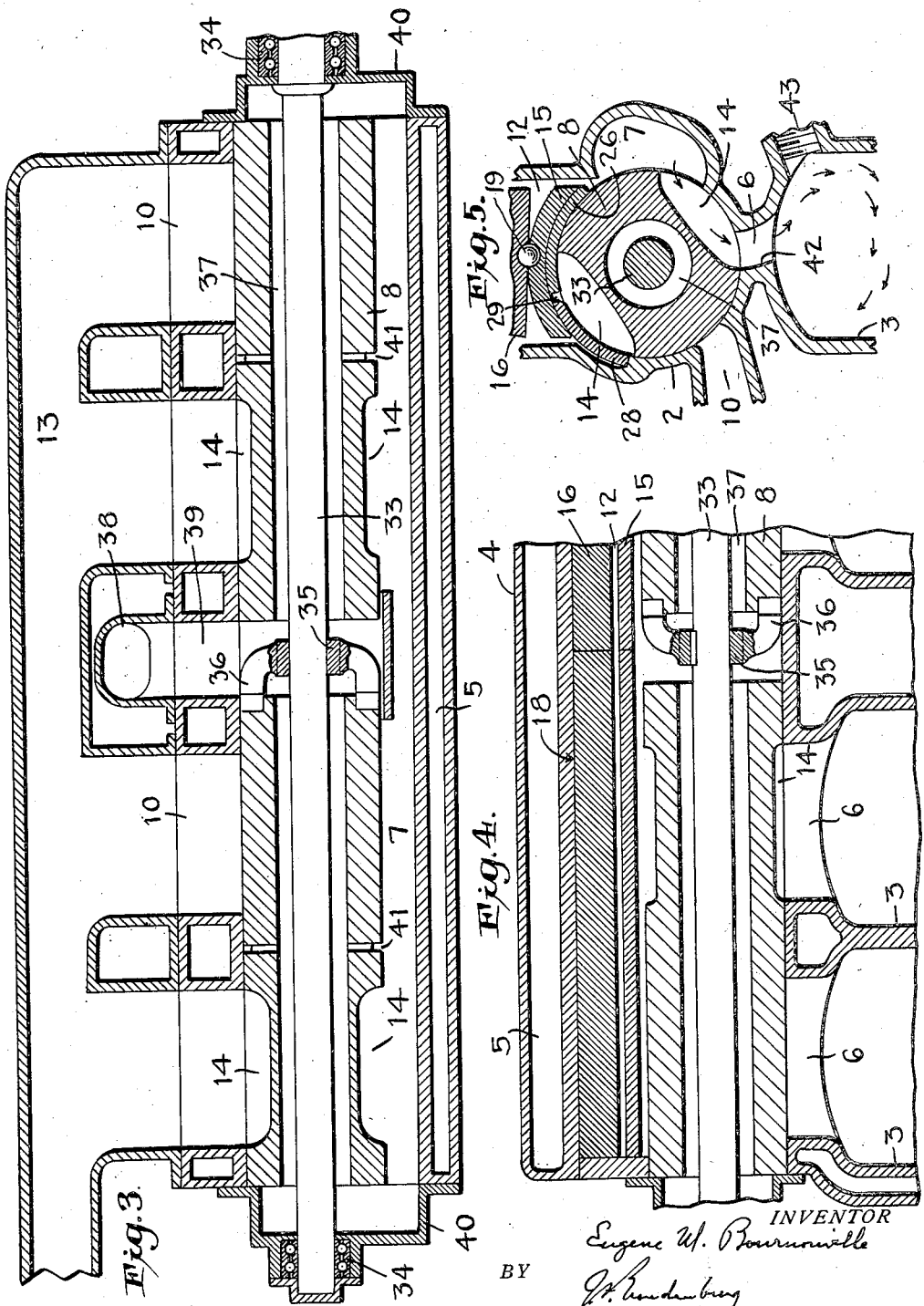

Patented Oct. 9, 1934

1,975,777

UNITED STATES PATENT OFFICE 1,975,777

ROTARY VALVE ENGINE

Eugene M. Bournonville, Jersey City, N. J.

Application July 28, 1933, Serial No. 682,566

13 Claims. (Cl. 123—190)

This invention relates to internal combustion engines and rotary valves therefor, and comprises improvements in combined intake and exhaust valves of the general type in which a rotating valve part, provided with external port cavities, places a single port opening into each cylinder in communication alternately with exhaust and intake passages or manifolds disposed at opposite sides of the cylinder ports.

One of the features of the invention comprises improvements in the more specific type of valve, forms of which are illustrated in Patents Nos. 1,442,705, 1,472,113, 1,576,082 and 1,614,323. In a valve of this kind there is a compensating device across from the cylinder port, this compensating device comprising a bearing shoe which is free to float circumferentially on the rotating valve part, and a movable backing means, preferably a wedge or slide, to which the floating bearing member is flexibly jointed, together with yielding means, such as a spring, opposing the drag of the rotating part on the floating bearings and the backing means. The nature of the backing means is such that movement thereof produced by the drag permits the floating shoe to move outward, while reverse movement of the backing means under the action of the spring causes the shoe to move inward, the shoe always floating circumferentially on the rotating part. In this way the bearing, in which the rotating part turns, automatically expands and contracts in accordance with expansion and contraction of the rotating part, and to take up wear, and the rotating part is at all times held tight against the bearing seats.

The provision of his very desirable compensating means was attended by a drawback, which was that it was necessary to make the rotating part of relatively large diameter and with three external port cavities instead of two for each cylinder, in order that the port cavities might be sufficiently wide circumferentially to give adequate clearance or the gases entering and leaving the cylinders, more especially for the exhaust gases, and still not permit the gases from the exhaust manifold to pass by way of the compensating device chamber to the intake manifold.

An object of this portion of the invention is to retain the advantages of a compensating device of the general kind that has been referred to, and to make it possible to employ therewith a rotating valve member which is considerably smaller and lighter than the one that would otherwise be required to give comparable effective areas of valve opening. The object is to secure superior performance in respect to free evacuation of burned gases, and also of free intake of fresh gases, and at the same time to keep the rotating part as small as possible. These ends are attained by the provision of a curved sealing piece, or flexible bearing element, which laps the circumferentially floating bearing shoe of the compensating device.

Objects of another feature of the invention are to shorten the effective travel of the carbureted mixture, thereby reducing frictional resistance, and to improve the mixing before these gases enter the cylinders. In valves of the general type first mentioned, some or all of the gases from the carburetor have usually been compelled to pass lengthwise through the interior of the rotating valve part, and thence into an external intake manifold open to the surface of the rotating valve part, whereby the fuel mixture keeps the combined intake and exhaust rotor cool. Preferably, the fresh gases are admitted at the middle of the rotating part of the valve, flow through its interior in opposite directions to the two ends, and then enter the ends of the manifold. In accordance with this portion of the present invention, the cooling by means of the combustible mixture is preserved, but the average length of travel of these gases is reduced and the distribution of the gases to the cylinders is improved by providing the rotating part with ports through its wall at the regions between the external port cavity regions, these ports through the wall being capable of passing substantial amounts of the charge gases from the inside of the rotating valve directly to the intake manifold. Furthermore, these ports, by emitting streams of the mixture into the flow of gases in the manifold, cause a useful secondary mixing to take place in the manifold.

Still other objects of the invention are to secure turbulence of the intake charge within the engine cylinder and to deflect the gases toward one side of the cylinder. Heretofore, in internal combustion engines having rotary valves of the general class to which the invention relates, the cylinder port opening through the middle of the head of the cylinder directed the incoming gases lengthwise of the cylinder. In accordance with this part of the invention, the cylinder port is formed to deflect to one side of the cylinder the gases streaming through the cylinder port from the external port cavity of the rotor. Thereby, the incoming charge is caused to swirl within the combustion chamber.

In the accompanying drawings illustrating the preferred embodiment of the invention:

Fig. 3 is a longitudinal section through the valve taken in the horizontal plane;

Fig. 4 is a fragmentary longitudinal section through the valve and the combustion chambers, taken on the line 4—4 of Fig. 1; and Fig. 5 is a view on a reduced scale illustrating the turbulent action of the gases taken into a combustion chamber.

Figure 1:
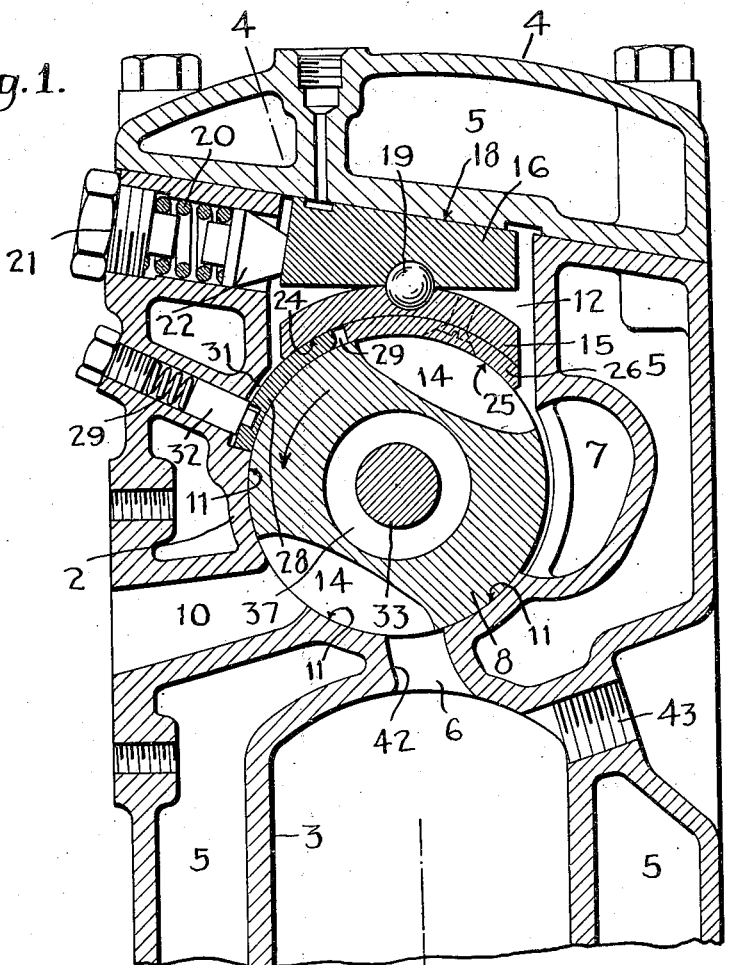
Fig. 1 is a vertical section through the valve and through the combustion chamber of one of the engine cylinders, the plane of the section being normal to the axis of the valve.

For simplicity of illustration the invention is shown applied to a four-cylinder engine, but it will be understood that there may be any number of cylinders.

The valve casing 2 surmounts the engine cylinders 3, the body of the casing being preferably cast integral with the cylinder block, and a cover 4 being preferably bolted to the casing body. The engine cylinder, the valve casing and the cover are shown as having suitable water-jacket spaces 5. Slot-like ports 6, one for each cylinder, open through the wall that forms the cylinder heads and the bottom of the valve casing. At one side of the row of cylinder ports 6, there is a longitudinal intake manifold, or passage, 7, formed in the casing. The inner side of this manifold is preferably directly open to the surface of the rotating valve part 8. At the other side of the line of cylinder ports, there are exhaust passages 10, one for each cylinder, for delivering the burned gases to an exhaust manifold 13, shown in Fig. 3.

The inside of the valve casing is formed with part of a cylindrical bearing surface 11, through which the ports 6 and 10 open. As explained in Patent 1,614,323, by restricting this fixed bearing or seat to an arc of less than 180°, expansion of the rotor is prevented from causing sticking or seizing.

Within the top of the valve casing, that is to say, opposite or across from the cylinder ports 6, there is a chamber 12, which may be in communication with the intake manifold 7.

The valve rotor 8 has two external port cavities 14 for each engine cylinder, these port cavities being opposite each other. Such port cavities are distinguished from ports that extend through the rotor or through the wall of the rotor. They are sunk in the thickness of the rotor, and as the rotor turns, form transfer passages from the cylinder ports 6 to the exhaust passages 10 and from the intake manifold 7 to the cylinder ports 6. In a rotor of relatively small diameter having two port cavities per cylinder, each port cavity can be wide enough on the circumference of the rotor to provide a wide and long-open clearance passage for the exhaust of burned gases and for the intake of fresh gases, ample effective areas for the exhaust being particularly desirable. The cylindrical surfaces of the solid portions of the rotor in the port cavity zones close the cylinder ports 6 for the proper period for compression and firing.

The chamber 12 contains a compensating device, the general nature of which was indicated in the introductory part of this specification. Within the broader scope of the invention, the mechanical constitution of the device may be varied. A construction similar to that disclosed in Patent No. 1,576,082 is preferably employed. A bearing shoe 15 having a cylindrically curved under surface floats circumferentially on the surface of the rotor. This shoe is backed by a slide 16, which it is convenient to term a wedge, though the part need not necessarily be of wedge form. The back of this wedge slides against a machined surface 18 formed in the top of the casing, this surface being at such an inclination that the backing member does not move, or at least has very little tendency to move, under radial force applied by the rotor to the shoe when the charges are fired in the cylinders. The shoe 15 has a curved back surface so that it can rock or roll on the under surface of the wedge, and the shoe is connected with the wedge by a key ball or balls 19. Thus, the shoe remains always in true bearing contact with the cylindrical surface of the rotor notwithstanding circumferential movements of the shoe and the sliding movements of the wedge connected to it.

The frictional drag of the rotor on the shoe tends to carry the shoe in the direction of rotation, and any such movement of the shoe causes the wedge to ride up the inclined way 18, thus enabling the shoe to move outward slightly with the expansion of the valve. Such movement is resisted by one or more springs 20, the pressure of which may be adjusted by screws 21, and which act through plugs 22 on the rear end of the wedge. This yielding means is of such strength that the wedge presses the shoe against the rotor with sufficient pressure to hold the rotor tight to its bearing seat, without any likelihood of binding. If the rotor contracts, the spring moves the wedge down the incline slightly and this moves the shoe inward.

The compensating device as described thus far does not differ from that shown in my prior patent. For the purpose of the present invention, however, a portion of one wing of the floating bearing element 15, namely the wing nearer the exhaust side is spaced away from the rotor. The under surface 24 of this portion is circularly curved on a radius larger than the circularly curved face 25 of the shoe that bears against the rotor. The shoe might be made of one piece in this manner, but for facility of manufacture it is preferable to make the shoe of a body portion having the surface 24 formed thereon, and a curved face piece 26 secured to the body and having the bearing surface 25.

The problem was to keep exhaust gases from passing from the exhaust manifold by way of the port cavities 14 to the chamber 12 and then into the intake manifold. This is accomplished by providing a curved piece 28 which extends from the portion of the fixed bearing surface 11 of the casing above the exhaust passages 10, over and in bearing contact with the surface of the rotor and lapping the floating shoe 15. This piece preferably extends within the curved slot between the motor and the surface 24. The inner and outer surfaces of the piece 28 are concentrically curved, and the fit within the slot is close enough, so that, with the oil films which are present, an effective seal is formed. The part 28 acts as a flexible bearing element, capable of accommodating itself to the expansion and contraction of the rotor. It is kept against the surface of the rotor by the shoe, and its curved outer surface permits the shoe to slide on it when the shoe moves circumferentially. A sufficient gap 29 is left between the end of the piece and the step of the shoe so that the sealing piece does not restrict these slight circumferential movements of the shoe.

Figure 2:
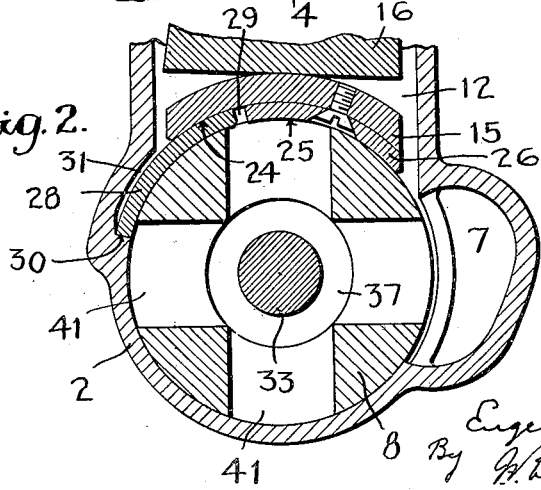
Fig. 2 is a section taken in a plane parallel to the plane of Fig. 1, at a region between cylinders, this view illustrating distributing ports in the rotor and also showing an alternative way of confining and holding the sealing piece.

The part 28 need not necessarily be a piece separate from the valve casing, though it is decidedly preferable that it should be separate as shown. As shown in Fig. 2, a separate piece may be held, or stopped, against circumferential movement by a shoulder 30 of the casing, against which the front or lower edge of the piece is constantly pressed by the drag of the rotor, and may be held to the rotor at this region by the wall of the casing, so that a sufficiently tight joint is made. An open space 31 behind the sealing piece leaves it free to yield to expansion of the rotor.

As an alternative, the sealing piece may be urged against the rotor, and also be held against circumferential movement, as shown in Fig. 1, by one or more springs 29 and one or more plungers 32. This device performs either or both of two functions, namely keeping the sealing piece against the rotor, notwithstanding expansion, contraction and wear, and anchoring the rotor against any backward circumferential movement, for which latter purpose the plunger has a reduced portion engaging an opening in the sealing piece.

The interior of the rotor is hollow, and the rotor is driven by a shaft 33 extending axially through the rotor and supported in independent end bearings 34. This shaft has a central driving member 35 having arms 36, the toothed ends of which engage notches in the adjacent ends of the valve rotor sections, allowing sufficient flexibility or universal movement to enable the valve sections to float freely in their bearings. This manner of driving the valve rotor is generally similar to that disclosed in Patent No. 1,229,574. It may be stated that the rotor may consist of any number of sections, with a suitable number of the compensating devices and of the sealing pieces 28.

Between the inner wall of the rotor and the shaft there is a longitudinal annular passage 37. Part or all of the carbureted mixture is admitted to this passage, for internal cooling of the combined intake and exhaust valve, flows longitudinally in the passage, and enters the intake manifold 7, where it gives further cooling. The specific construction may be varied, but preferably the fresh mixture is introduced into the rotary part of the valve at the middle, through a carbureter connection 38, and opening 39 through the valve casing, and the driving member 35, passes in opposite directions through the inside of the rotary part, and then turns through the interiors of hollow end caps 40 into the ends of the intake manifold, as disclosed in Patent No. 1,229,574. The region of admission is substantially closed from the intake manifold by a wall 9.

The purpose of one part of the present invention is, while obtaining effective cooling of the valve by the fuel mixture, to reduce the average length of flow of the mixture through the valve to the cylinders and to secure better distribution. This is accomplished by cutting ports 41 through the wall of the rotary part 8, at the regions thereof which are between the zones of the port cavities 14. These ports 41, while comparatively narrow lengthwise of the valve, as seen in Fig. 3, are wide enough transversely of the valve (Fig. 2) to give them a substantial effective area, through which the fuel gases can pass readily from the inside of the rotor into the manifold 7. The streams of gas mixture issuing from these ports into the manifold at an abrupt angle to the flow moving in one direction or the other therein are broken up and create turbulence, the effect being to secure more complete mixing and to promote vaporization of liquid particles remaining in the mixture.

The fuel mixture is admitted from the intake manifold to the several cylinders of the engine at the proper times, by the port cavities 14 establishing passages from the manifold to the cylinder ports 6. In accordance with the present invention these ports 6 in the heads of the cylinders are inclined or curved toward one side or another of the cylinders, but preferably in a direction reverse to the direction of flow from the manifold to said ports. In Fig. 5, the flow is indicated as proceeding downward and to the left from the manifold to the cylinder port, and downward and to the right from the cylinder port into the cylinder, the inclined wall 42 of the port acting as a deflector baffle. Preferably, the charge flowing into the cylinder is directed first toward the position 43 of the spark plug, and develops reverse swirl currents in the cylinder chamber, producing beneficial turbulence. The precise direction may be varied.

The operation of the features of the invention has been explained in connection with the description of the construction, and need not be repeated.

It will be understood that various changes may be made in the details, and that the application of the features of the invention is not restricted to the preferred embodiment that has been illustrated.

I claim:

1. A rotary valve for internal combustion engines, comprising, in combination, a casing having seat portions, lateral intake and exhaust passages at opposite sides of a cylinder port and a chamber across from the cylinder port, a rotating valve part having external port cavities for connecting the cylinder port alternately with the exhaust and intake passages, compensating means in such chamber comprising a bearing shoe floating circumferentially on the surface of the valve member, a wedge to which said shoe is connected, and yielding means opposing the drag of the valve member on the shoe and wedge, and a flexible bearing element having concentric inner and outer surfaces overlying the rotary valve part and lapping the floating bearing shoe, to provide a seal substantially preventing passage of exhaust gases to the compensating means chamber or thence to the intake passage.

2. A rotary valve having a casing the fixed bearing surfaces of which are included within an arc of less than 180°, said casing having a cylinder port, lateral intake and exhaust passages, and a chamber across from the cylinder port and in communication with the lateral intake passage, a rotary valve part having not more than two external port cavities for each engine cylinder, compensating means in said chamber including a bearing shoe floating circumferentially on the surface of the valve member, and a curved sealing piece free to accommodate itself to expansion and contraction of the rotating valve part, said sealing piece being held in the casing against the drag of the rotating part, and coacting with the floating bearing shoe so as to keep exhaust gases from passing from a port cavity to the compensating means chamber when the port cavity would otherwise place them in communication.

3. In a rotary valve, having a casing provided with a cylinder port and intake and exhaust passages, a rotary valve part having external port cavities to place the cylinder port in communication with the intake and exhaust passages; the combination therewith of compensating means including a bearing shoe floating circumferentially on the rotating valve part, said bearing shoe having two curved inner surfaces, one bearing on the rotating part and the other spaced therefrom, and a curved sealing part bearing on the rotating part and lying partly between it and the inner surface of the shoe that is spaced fom the rotary part.

4. A rotary valve, comprising a casing provided with a cylinder port and intake and exhaust passages, a rotary valve part having external port cavities to place said cylinder port in communication with the intake and exhaust passages, compensating means including a bearing shoe floating circumferentially on the rotating valve part, said bearing shoe having two curved inner surfaces, one bearing on the rotating part and the other spaced therefrom, and a curved sealing element bearing on the rotating part, adjacent the exhaust passage, and lying partly between the rotating part and the inner surface of the shoe that is spaced from the rotating part, said sealing element being a piece separate from the casing, and the casing containing means for holding said element.

5. A rotary valve of the kind described, serving for both intake and exhaust, in which there is a compensating device including a circumferentially floating shoe bearing on the rotating valve part, said shoe having a curved piece applied to a portion of the curved inner surface of the body of the shoe so that the remainder of said surface is spaced away from the rotating part, and in which there is a curved sealing element bearing on the rotating part and entering closely between the same and the inner surface of the body of the floating bearing shoe.

6. A rotary valve comprising a casing, a rotating part a compensating device including a shoe floating circumferentially on the rotating part, said shoe being constructed so that there is a curved slot between one of its wings and the rotating part, and a curved bearing and sealing element held in the casing against the drag of the rotating part and extending within said slot, said sealing element accommodating itself to expansion and contraction of the rotating part and accommodating the circumferential floating action of the shoe.

7. A rotary combined intake and exhaust valve, having a circumferentially floating bearing element, and a flexible bearing and seal lapping said circumferentially floating element.

8. A rotary combined intake and exhaust valve, having a circumferentially floating bearing element, a flexible bearing and seal lapping said circumferentially floating element, and means for pressing said element against the rotary part of the valve.

9. A rotary combined intake and exhaust valve, having a circumferentially floating bearing element, a flexible bearing and seal lapping said circumferentially floating element, and means for anchoring said element against circumferential movement.

10. A rotary combined intake and exhaust valve, having a circumferentially floating bearing element, a flexible bearing and seal lapping said circumferentially floating element, and means for pressing said element against the rotary part of the valve and for restraining it against circumferential movement.

11. A rotary valve controlling both intake and exhaust of an internal combustion engine, said valve having a casing provided with ports to the engine cylinders, a longitudinal intake manifold and exhaust passages, a rotating valve part having external port cavities to establish communication between the cylinder ports and the intake manifold and the exhaust passages alternately, said rotating part having a longitudinal internal passage, and means for admitting fresh carbureted mixture to said internal passage to flow through the same and cool the rotating part, there being ports through the wall of said rotating part intermediate the port cavity regions, these ports being adapted to distribute the carbureted mixture from the interior of the rotating part into the intake manifold at intervals along the length thereof.

12. A rotary valve controlling both intake and exhaust of an internal combustion engine, said valve having a casing provided with ports to the engine cylinders, a longitudinal intake manifold and exhaust passages, a rotating valve part having external port cavities to establish communication between the cylinder ports and the intake manifold and the exhaust passages alternately, said rotating part having a longitudinal internal passage, and means for admitting fresh carbureted mixture to said internal passage to flow through the same and cool the rotating part, there being ports through the wall of said rotating part intermediate the port cavity regions, these ports being adapted to emit streams of the carbureted mixture into the interior of the intake manifold so as to promote mixing therein.

13. A rotary valve controlling both intake and exhaust of an internal combustion engine, said valve having a casing provided with ports to the engine cylinders, a longitudinal intake manifold, and exhaust passages, a rotating part having external port cavities, said rotating part being hollow to provide a longitudinal, internal passage for the carbureted mixture, the ends of said passage being in communication with the ends of said intake manifold, means for admitting the carbureted mixture to said internal passage, and ports through the wall of said rotating part, between the regions of said port cavities, the last-mentioned ports being large enough to permit much of the carbureted mixture to pass from said internal passage directly into the intake manifold, thereby shortening the average flow of the carbureted mixture and materially reducing the frictional resistance to flow, while still causing a considerable portion of the carbureted mixture to pass through the interior of the rotating part to cool the same.

EUGENE M. BOURNONVILLE.